United States Patent
Anisimov (10) Patent No.: US 8,265,152 B2
(45) Date of Patent: Sep. 11, 2012

(54) SYSTEM AND METHOD FOR LOW-LATENCY PROCESSING OF INTRA-FRAME VIDEO PIXEL BLOCK PREDICTION

(75) Inventor: Igor Anisimov, St. Petersburg (RU)

(73) Assignee: Arecont Vision, LLC., Glendale, CA (US)

( * ) Notice: Subject to any disclaimer, the term of this patent is extended or adjusted under 35 U.S.C. 154(b) by 993 days.

(21) Appl. No.: 12/249,410

(22) Filed: Oct. 10, 2008

(65) Prior Publication Data

US 2010/0091860 A1 Apr. 15, 2010

(51) Int. Cl.
*H04N 7/12* (2006.01)

(52) U.S. Cl. ......... 375/240.13; 375/240.11; 375/240.12; 375/240.14; 375/240.15; 375/240.16; 375/240.17; 375/240.18; 375/240.19; 375/240.01; 375/240.21; 348/403.1; 348/404.1; 348/407.1; 348/409.1

(58) Field of Classification Search ............. 375/240.12–240.15, 240.18–240.2, 375/240.11–240.26, 240.01; 348/403, 404.1, 348/407.1, 409.11

See application file for complete search history.

(56) References Cited

U.S. PATENT DOCUMENTS

| | | | |
|---|---|---|---|
| 2005/0027912 A1* | 2/2005 | Kondo et al. | 710/62 |
| 2006/0050784 A1* | 3/2006 | Lappalainen et al. | 375/240.03 |
| 2009/0067503 A1* | 3/2009 | Jeong et al. | 375/240.16 |
| 2009/0257496 A1* | 10/2009 | Auyeung | 375/240.15 |

\* cited by examiner

*Primary Examiner* — Yin-Chen Shaw
*Assistant Examiner* — Roderick Tolentino
(74) *Attorney, Agent, or Firm* — Christie, Parker & Hale, LLP.

(57) ABSTRACT

A method and system for low-latency processing of intra-frame video pixel block prediction including: predicting a pixel block based on boundary pixels of left and upper neighbor blocks of said pixel block; subtracting said predicted pixel block from a source pixel block to generate a prediction error; forward transforming and quantizing said prediction error to generate a residual data; inverse transforming and quantizing said residual data; adding said predicted pixel block to said inverse transformed and quantized residual data to generate a reconstructed pixel block; pre-computing blocks of DC-coefficients used with luma and chroma intra prediction modes; pre-computing mode selection of a best prediction mode of said luma and chroma intra prediction modes; and outputting said residual data to be used in entropy or arithmetic coding, and a reconstructed data used for motion prediction.

20 Claims, 4 Drawing Sheets

SYSTEM AND METHOD FOR LOW-LATENCY PROCESSING OF INTRA-FRAME VIDEO PIXEL BLOCK PREDICTION

FIELD OF THE INVENTION

The present invention relates generally to image processing; and more particularly to image compression.

BACKGROUND

Intra prediction is a compression method used in h.264 standard for video compression, in conjunction with other methods. The method includes a prediction of pixel blocks based on previously encoded and reconstructed blocks in the same frame. One of the characteristics of the h.264 standard (see, for example, ITU-T Recommendation H.264 March 2005, the entire contents of which is expressly incorporated by reference herein) is the possibility of dividing an image in regions called slices. A slice is defined as a sequence of macroblocks being processed in progressive scan order (left to right and top to bottom). A slice is decoded independently. Each macroblock contain luminance and chrominance samples (also referred as luma and chroma samples) which are grouped into blocks of standard sizes 4×4 or 8×8 pixels.

Figure 1:
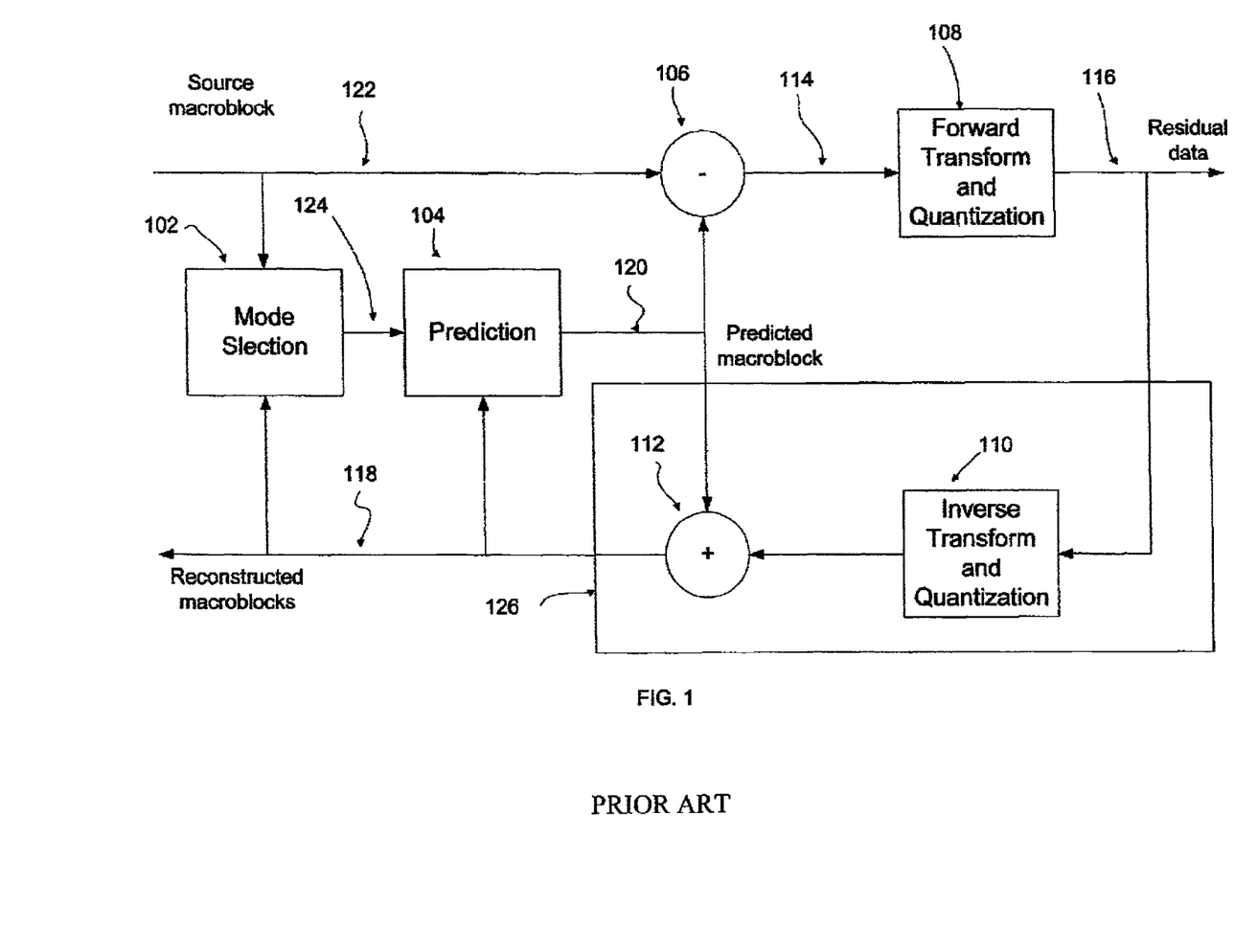
FIG. 1 is a block diagram for a typical intra prediction process.

Intra prediction process is connected with transform and quantization processes of the h.264 standard and similar image compression methods, therefore, they are typically considered jointly. A typical block diagram for a conventional intra prediction process is shown in FIG. 1. The process contains forward data path with modules 102, 104, 106, 108, and inverse data path with modules 110 and 112. When source block 122 passes through all computing stages of forward and inverse path it becomes a reconstructed block 118. The reconstructed block feeds a mode selection module 102 and a prediction module 104, where it is saved to be used as a left block neighbor and an upper block neighbor of the block to be predicted. The mode selection module 102 estimates a best prediction mode 124. According to this best prediction mode, a prediction module 104 generates a predicted counterpart 120 for the new source block 122 (this would be the next macroblock to be generated, with respect to the reconstructed block). There are several prediction modes in the h.264 standard, for example, 4 modes for 16×16 luminance block prediction, 9 modes for 4×4 luminance block prediction and 4 modes for chrominance block prediction. A subtracter module 106 generates a prediction error 114 by subtracting the predicted block from the source block. The prediction error is transformed and quantized by the module 108 resulting in residual data 116 that is subsequently used, according to h.264 standard and similar image compression methods, in entropy coding process. The residual data also feeds the inverse data path. The inverse data path presents a decoding part of the intra prediction process and includes an inverse transform and quantization module 110 and an adder 112. The result of inverse data path processing is a new reconstructed block that is used for predicting next block in the current frame. The results of intra prediction are the (best) mode which gives minimum prediction error and the prediction error itself. The reconstructed block and the residual data are then outputted from the pipeline by an output module (not shown). The residual data is used for entropy or arithmetic coding and the reconstructed data is used for motion prediction, according to h.264 standard and similar image compression methods.

Typically, a mode selection process/module includes computing all prediction modes and selecting one of them based on some measure of prediction quality. The conventional measure is a sum of absolute differences (SAD) or a sum of squared differences (SSD) between source and predicted blocks. When the best mode is found, a corresponding predicted block is selected as a result of the prediction.

It is desirable to have an effective way for hardware implementation of such methods by using pipelined hardware architectures. However, in case of intra prediction method, due to a feedback loop 126 including inverse transforms and quantization, the pipeline implementation is severely restricted. In particular, the pipeline latency period needs to be less than the time period available for processing one block, so that a reconstructed block would be ready before a new block is arrived. This feedback loop latency is a major problem for an efficient pipelined hardware implementation of the intra prediction methods.

SUMMARY

In some embodiments, the present invention is directed to a method and system for low-latency processing of intra-frame video pixel block prediction. The method and system include: predicting a pixel block based on boundary pixels of left and upper neighbor blocks of said pixel block; subtracting said predicted pixel block from a source pixel block to generate a prediction error; forward transforming and quantizing said prediction error to generate a residual data; inverse transforming and quantizing said residual data; adding said predicted pixel block to said inverse transformed and quantized residual data to generate a reconstructed pixel block; pre-computing blocks of DC-coefficients used with luma and chroma intra prediction modes; pre-computing mode selection of a best prediction mode of said luma and chroma intra prediction modes; and outputting said residual data to be used in entropy or arithmetic coding, and a reconstructed data used for motion prediction.

In some embodiments, the present invention is directed to a method for low-latency processing of a block of DC coefficients of a video pixel block in an intra-frame video pixel block prediction. The method includes: predicting a DC-block based on boundary pixels of left and upper neighbor blocks of said DC-block; pre-computing a block of DC coefficients for a source block and said predicted pixel block to be used with a plurality of prediction modes; subtracting said source DC-block from said predicted DC-block to obtain a prediction error for said DC-block; transforming and quantizing said prediction error to generate a residual data, wherein said pre-computing a DC-block is performed before said subtraction and transformation; inverse transforming and quantizing said residual data; adding said predicted DC-block to said inverse transformed and quantized residual data to generate a reconstructed block; and outputting said residual data and said reconstructed block.

DETAILED DESCRIPTION

The present invention is a system and method for hardware implementation of intra prediction methods used in h.264 and similar image compression methods. In some embodiments, the present invention is a pipelined hardware architecture for intra prediction that provides idle-less processing of data. The pipelined architecture of the present invention may be implemented in Field Programmable Gate Arrays (FPGA), Application Specific Integrated Circuit (ASIC), or any other hardware implementation.

In some embodiments, the presented invention is a method for intra prediction that provides low-latency feedback loop by including pre-computation of DC-block, pre-computation of mode selection and a luma and chroma interleaving. As applied to video, luma represents the brightness in an image, that is, the black and white or achromatic portion of the image. Luma is typically paired with chroma. Luma components represent the achromatic image without any color, while the chroma components represent the color information.

The method of the present invention is generally oriented to hardware implementation, but in some embodiments, may be implemented in software to be executed by a general purpose computer, such as a Personal Computer (PC), or a special purpose computer. Alternatively, the method of the present invention may be implemented by firmware to be executed by a Reduced Instruction Set Computer (RISC) hardware, or Digital Signal Processor (DSP) hardware or chip in a more efficient low-latency manner.

In some embodiments, the present invention is a method of DC-coefficient pre-computation for reducing a feedback loop latency caused by additional DC-coefficients transforms used with several intra prediction modes, according to h.264 standard and similar image compression methods.

In some embodiments, the present invention is a method of fast mode selection based on partially pre-computation of prediction quality measure used for selection for reducing a feedback loop latency caused by need of computing all predicted macroblocks before selecting the best prediction mode.

In some embodiments, the present invention is a method of luma and chroma interleaving for making the pipeline insensitive to a feedback loop latency caused by a numbers of fast mode selection processing clock cycles and latency of prediction, subtraction, addition, transform and quantization modules.

Figure 2:
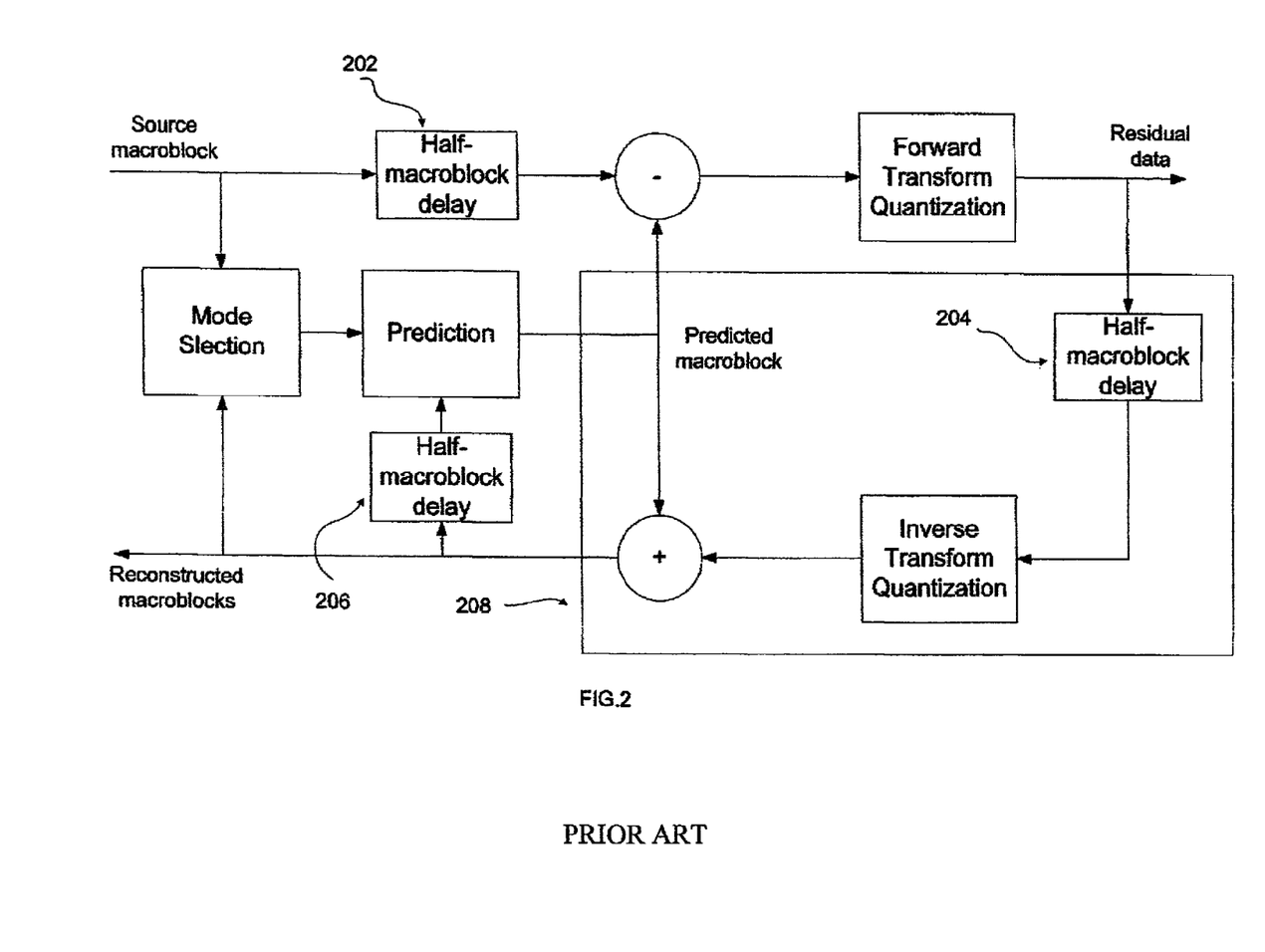
FIG. 2 is a block diagram for a typical pipeline implementation of a typical intra prediction process illustrating a feedback loop latency problem.

A conventional pipelined implementation of intra prediction algorithm results in long latency periods in the feedback loop, which prevents the pipeline from efficiently (idle-less) operating. FIG. 2 is a block diagram of a conventional pipeline implementation, which illustrates the feedback loop 208 latency problem. There are three main components of such latency: a latency needed for residual data reordering that is shown as delay buffer 204; a latency for mode selection that is shown as delay buffers 202 and 206, and a latency provided by other modules including addition, subtraction, prediction, forward and inverse transform and quantization modules. Three modules/methods are developed to minimize or eliminate these three latency components; a DC-block pre-computation module/method, a prediction and mode selection pre-computation module/method and, and a luma and chroma interleaving module/method. These modules/methods are also applicable to luma and all chroma prediction modes including horizontal, vertical and DC modes.

Figure 3:
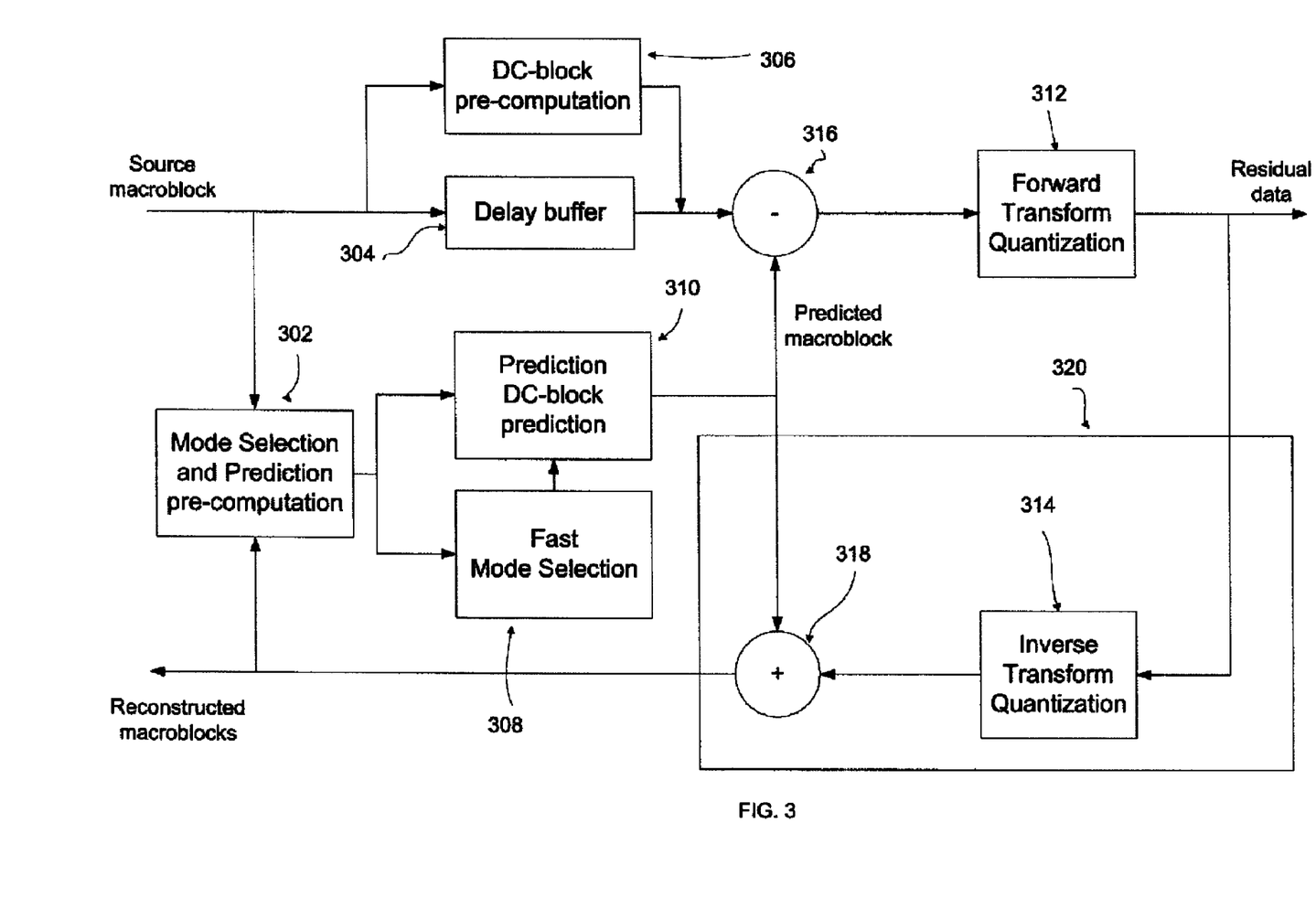
FIG. 3 is an exemplary block diagram for an exemplary pipeline implementation of an intra prediction process according to some embodiments of presented invention.

FIG. 3 is an exemplary block diagram of an exemplary intra prediction pipeline, according to some embodiments of presented invention. The pipeline includes a pre-computation module 302 for mode selection and prediction, a DC-block pre-computation module 306, a delay buffer 304, and a fast mode selection module 308, in addition to a subtracter module 316, a forward transform & quantization module 312, an inverse transform & quantization module 314, and an adder module 318.

The latency due to the residual data reordering is generated by using additional transforms of DC-coefficients needed for a 16×16 luma and chroma intra prediction modes. More specifically, after all blocks of the current macroblock have been transformed using a discrete cosine transform (DCT), the left-upper pixel of each block is extracted. The pixels are used to construct 3 new blocks, one for the luma and two for the chroma. The positions of the pixels in new blocks are fixed and specified by h.264 standard and similar image compression methods. These pixels are referred to as DC-coefficients and the new blocks are referred to as DC-blocks. According to the standard, these blocks are transformed using Hadamard transform (by 312 & 314 modules), which is a generalized class of Fourier transforms. The transform of DC-blocks is performed after all blocks in the macroblock are processed. For the inverse transform, the DC-blocks must be transformed before other blocks of the macroblock, therefore, a reordering of blocks is needed. This reordering produces a latency of at least half-a-macroblock period, labeled in FIG. 2 as 204.

To avoid this latency due to block reordering, a DC-block pre-computation module 306 is used, as shown in FIG. 3. The present invention takes advantage of the linear property of the transforms required by the h.264 standard and similar image compression methods to compute the DC-blocks before the transforms and subtraction. For example, for each block in macroblock, the DC-coefficient is calculated as two scalar products, or in case of DCT, as the sum of pixels in the block. The DC-block is computed for both the source macroblock and the predicted macroblock. Due to the rounding rules in the h.264 standard, however, DC-block prediction can not be done for plane prediction mode. Nevertheless, DC-block prediction works for horizontal, vertical and DC modes. The source DC-block is then subtracted from the predicted DC-block to obtain a prediction error for the DC-block that is sent to (Hadamard) transform and quantization module 312. By pre-computing the DC-blocks, a residual DC-block, the result of Hadamard transform and quantization, can be obtained from module 312 before other blocks and, therefore, no reordering before module 314 is needed in the feedback loop. Thus, DC-block pre-computation eliminates one of the sources of unnecessary half-macroblock latency in the feedback loop.

A mode selection is another source of latency. Typically, mode selection occurs when generating predicted blocks for all modes and selecting one of them as the result of prediction. The result can not be selected until the entire block has been generated and prediction quality measures have been computed. Therefore, for this purpose, at least half-a-macroblock latency is needed as shown in FIG. 2 by modules 202 and 206. This latency belongs to the feedback loop and therefore it keeps the pipeline idling.

To avoid idling of the pipeline due to mode selection, a pre-computation of some coefficients needed for mode selection and prediction is used. According to the h.264 standard and similar image compression methods, intra prediction process takes only one last column and one last row of neighbor blocks. Accordingly, the present invention finds such prediction measure that can be directly computed on the basis of neighbor pixels, instead of generating the entire predicted block and subsequently computing a measure. However, the SAD method does not allow doing this but SSD method does. SSD method needs to be customized for each mode to be pre-computed.

The SSD measure computation is divided into two parts where one part is performed by a mode selection pre-computation module 302 and the other part by a fast mode selection module 308, as shown on FIG. 3. The pre-computation module 302 computes only that portion of the SSD values which require an entire macroblock period to be computed. Since pre-computation module 302 is not a part of feedback loop path, it can have a latency of any length, that is, it does not cause the pipeline to idle. The fast mode selection module 308 computes the rest of the SSD values, which are not very computation intensive. The fast mode selection module 308 also selects the minimum of SSD values among SSD values computed for all prediction modes. In other words, SSD values are computed as sum of two components, one of the components is pre-computed and then added to the other components in the fast mode selection module. As a result, the fast mode selection combined with the pre-computation eliminates one of the sources of unnecessary half-macroblock latency in the feedback loop. Delay buffer 304 is added for compensation of latency produced by pre-computation modules 302 and 306. Since this latency is not in feedback loop 320, it does not impact the pipeline latency.

In addition to latency sources 204 and 206 in FIG. 2, every module in feedback loop, including modules 308, 310, 312, 314, 316 and 318 in FIG. 3, provides a short latency. In sum, these latencies can make up a delay value comparable to half-a-macroblock latency (not shown). This latency can not be eliminated, however, according to some embodiments of present invention, the overall pipeline can be made insensitive to that latency by use of luma and chroma interleaving.

Luma and chroma interleaving implies sending luma and chroma parts of a macroblock one after the other into the same pipeline. Typically, without interleaving, macroblock processing can not start until the previous block processing has been completed. However, luma prediction process requires access only to the luma blocks in the reconstructed macroblock, and chroma macroblock requires access only to the chroma blocks in the reconstructed macroblock. When luma component of one macroblock is being processed and processing is not yet completed, processing chroma component of the macroblock can be started. When the chroma is being processed, the luma block processing is completed and a new luma macroblock processing can get started. Accordingly, luma and chroma macroblocks are processed continuously in the pipeline and therefore the pipeline is not idling. Thus, luma and chroma interleaving make overall pipeline insensitive to the said feedback loop latency that is required for luma or chroma part of macroblock processing.

Figure 4:
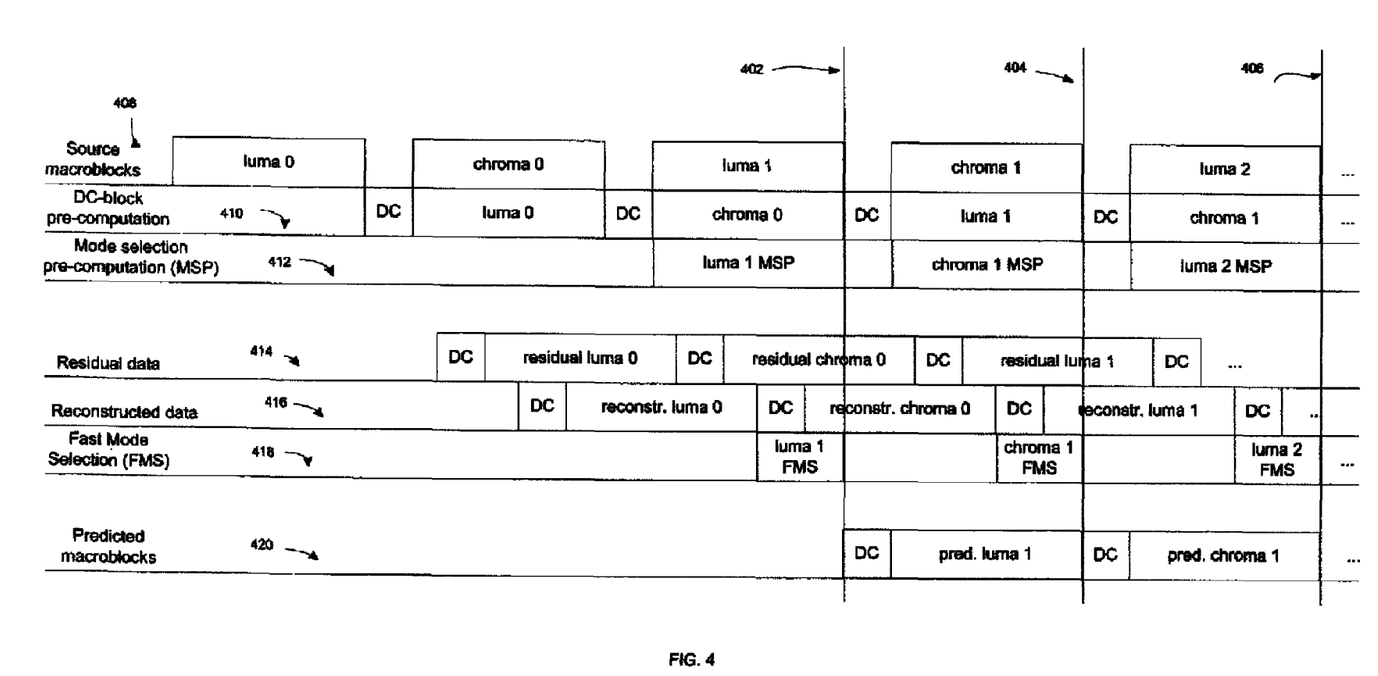
FIG. 4 is an exemplary timing diagram of a pipeline structure, according to some embodiments of the present invention.

FIG. 4 is an exemplary timing diagram for a pipeline structure, according to some embodiments of the present invention. The exemplary timing diagram depicts how the pipeline processing for a DC-block pre-computation module/method, a prediction and mode selection pre-computation module/method, and a luma and chroma interleaving method is performed in each stage. In this example, the timing of the pipeline relates to luma 16×16 and chroma 8×8 intra prediction modes, but, in general, in some embodiments, said pre-computations and interleaving can be used with other modes. DC-block pre-computation, shown as 410, provides at least half macroblock latency relating to the source data flow, shown as 408. As shown, mode selection pre-computation 412 is done by the end of the current source macroblock 408, which is marked by time stamps 402, 404, and 406, in FIG. 4. Mode selection pre-computation 412 has no time shifts relating to source macroblock 408. Residual data 414, as well as reconstructed data 416 appear with some latency, relating to 410, which is needed for forward and inverse transforms and quantizations. Fast mode selection process 418 starts after the reconstructed macroblock is ready, and ends before the time stamps 402, 404, 406. Finally, predicted macroblock 420 starts being generated at the time stamps 402, 404, 406 and has no time shifts relating to 410, as depicted in FIG. 4.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A pipelined apparatus for processing intra-frame video pixel block prediction comprising:
    a prediction module for predicting a pixel block based on boundary pixels of left and upper neighbor blocks of said pixel block;
    a DC pre-computation module for pre-computing a block of source DC-coefficients used with luma and chroma intra and inter prediction modes, based on said pixel block;
    a DC coefficients prediction module for predicting a block of predicted DC-coefficients, based on a reconstructed pixel block;
    a subtractor module for subtracting said predicted DC-coefficients from said source DC-coefficients to generate DC-coefficients of a prediction error;
    a forward transform module for forward transformation and quantization of said prediction error to generate a residual data;
    an inverse transform module for inverse transformation and quantization of said residual data;
    an adder module for adding said predicted pixel block to said inverse transformation and quantization of said residual data to generate said reconstructed pixel block;
    a mode selection and prediction pre-computation module to pre-compute mode selection of a best prediction mode of said luma and chroma intra and inter prediction modes, before said reconstructed block is generated; and
    an output module for outputting said residual data used in entropy or arithmetic coding, and said reconstructed pixel block;
    wherein all modules are hardware.

2. The apparatus of claim 1, further comprising an electronic circuit for interleaving processing of luma and chroma components of said reconstructed block.

3. The apparatus of claim 2, wherein said an electronic circuit for interleaving is configured to send said luma and chroma components one after the other into the pipeline apparatus so that processing of said chroma components is started when said luma components are being processed.

4. The apparatus of claim 1, wherein said intra-frame video pixel block prediction is based on h.264 standard.

5. The apparatus of claim 1, wherein said prediction module predicts said predicted pixel block based on a sum of squared differences (SSD) method.

6. The apparatus of claim 5, further comprising a fast mode selection module for computing a first component of the SSD values and selecting a minimum of SSD values among SSD values computed for all prediction modes, and wherein said a pre-computation module is configured to compute a second component of the SSD values which requires an entire pixel block period to be computed.

7. A method for low-latency processing of intra-frame video pixel block prediction, the method comprising:
electronically predicting a pixel block based on boundary pixels of left and upper neighbor blocks of said pixel block;
electronically pre-computing a block of source DC-coefficients used with luma and chroma intra and inter prediction modes, based on said pixel block;
electronically predicting a block of predicted DC-coefficients, based on a reconstructed pixel block;
electronically subtracting said predicted DC-coefficients from said source DC-coefficients to generate DC-coefficients of a prediction error;
electronically forward transforming and quantizing said prediction error to generate a residual data;
electronically inverse transforming and quantizing said residual data;
electronically adding said predicted pixel block to said inverse transformed and quantized residual data to generate said reconstructed pixel block;
electronically pre-computing mode selection of a best prediction mode of said luma and chroma intra and inter prediction modes, before said reconstructed block is generated; and
electronically outputting said residual data to be used in entropy or arithmetic coding, and a reconstructed data used for motion prediction.

8. The method of claim 7, further comprising electronically interleaving processing of luma and chroma components of said reconstructed block.

9. The method of claim 8, wherein said interleaving comprises starting processing of said chroma components when said luma components are being processed.

10. The method of claim 7, wherein said intra-frame video pixel block prediction is based on h.264 standard.

11. The method of claim 7, wherein said predicted pixel block is determined based on a sum of squared differences (SSD) method.

12. The method of claim 11, further comprising electronically computing a first component of the SSD values, selecting a minimum of SSD values among SSD values computed for all prediction modes, and electronically computing a second component of the SSD values which requires an entire pixel block period to be computed.

13. A method for low-latency processing of a block of DC coefficients of a video pixel block in an intra-frame video pixel block prediction, the method comprising:
electronically predicting a DC-block based on boundary pixels of left and upper neighbor blocks of said pixel block;
electronically pre-computing a block of source DC coefficients for a pixel block and said predicted pixel block to be used with a plurality of prediction modes;
electronically predicting a block of predicted DC-coefficients, based on a reconstructed pixel block;
electronically subtracting said source DC-block from said predicted DC-block to obtain a prediction error for said DC-block;
electronically transforming and quantizing said prediction error to generate a residual data, wherein said pre-computing a DC-block is performed before said subtraction and transformation;
electronically inverse transforming and quantizing said residual data;
electronically adding said predicted DC-block to said inverse transformed and quantized residual data to generate a reconstructed block; and
electronically outputting said residual data and said reconstructed block.

14. The method of claim 13, further comprising electronically interleaving processing of luma and chroma components of said reconstructed block.

15. The method of claim 14, wherein said interleaving comprises starting processing of said chroma components when said luma components are being processed.

16. The method of claim 14, wherein said intra-frame video pixel block prediction is based on h.264 standard.

17. The method of claim 14, wherein said predicted DC-block is determined based on a sum of squared differences (SSD) method.

18. The method of claim 14, further comprising electronically computing a first component of the SSD values, selecting a minimum of SSD values among SSD values computed for all prediction modes, and electronically computing a second component of the SSD values which requires an entire pixel block period to be computed.

19. The method of claim 14, further comprising using said residual data in entropy or arithmetic coding.

20. The method of claim 14, further comprising using said reconstructed data for motion prediction.

* * * * *

UNITED STATES PATENT AND TRADEMARK OFFICE
CERTIFICATE OF CORRECTION

PATENT NO.          : 8,265,152 B2
APPLICATION NO.     : 12/249410
DATED               : September 11, 2012
INVENTOR(S)         : Igor Anisimov It is certified that error appears in the above-identified patent and that said Letters Patent is hereby corrected as shown below:

Delete the title page and substitute therefore with the attached title page consisting of the corrected illustrative figure.

In the Drawings

| | |
|---|---|
| FIG. 1, Sheet 1 of 4 | Delete Drawing Sheet 1 and substitute therefore the Drawing Sheet, consisting of FIG. 1 as shown on the attached page |
| FIG. 2, Sheet 2 of 4 | Delete Drawing Sheet 2 and substitute therefore the Drawing Sheet, consisting of FIG. 2 as shown on the attached page |

In the Claims

| | |
|---|---|
| Column 6, Claim 3, line 58 | Delete "an" |
| Column 7, Claim 6, line 4 | Delete "a" |

Signed and Sealed this
Eighth Day of September, 2015

Michelle K. Lee
*Director of the United States Patent and Trademark Office*

(12) United States Patent
Anisimov (10) Patent No.: US 8,265,152 B2
(45) Date of Patent: Sep. 11, 2012

(54) SYSTEM AND METHOD FOR LOW-LATENCY PROCESSING OF INTRA-FRAME VIDEO PIXEL BLOCK PREDICTION

(75) Inventor: Igor Anisimov, St. Petersburg (RU)

(73) Assignee: Arecont Vision, LLC., Glendale, CA (US)

( * ) Notice: Subject to any disclaimer, the term of this patent is extended or adjusted under 35 U.S.C. 154(b) by 993 days.

(21) Appl. No.: 12/249,410

(22) Filed: Oct. 10, 2008

(65) Prior Publication Data
US 2010/0091860 A1 Apr. 15, 2010

(51) Int. Cl.
H04N 7/12 (2006.01)

(52) U.S. Cl. ......... 375/240.13; 375/240.11; 375/240.12; 375/240.14; 375/240.15; 375/240.16; 375/240.17; 375/240.18; 375/240.19; 375/240.01; 375/240.21; 348/403.1; 348/404.1; 348/407.1; 348/409.1

(58) Field of Classification Search .......... 375/240.12–240.15, 240.18–240.2, 375/240.11 240.26, 240.01; 348/403, 404.1; 348/407.1, 409.11
See application file for complete search history.

(56) References Cited

U.S. PATENT DOCUMENTS

| 2005/0027912 | A1* | 2/2005 | Kondo et al. ............ 710/62 |
| 2006/0050784 | A1* | 3/2006 | Lappalainen et al. ... 375/240.03 |
| 2009/0067503 | A1* | 3/2009 | Jeong et al. ............ 375/240.16 |
| 2009/0257496 | A1* | 10/2009 | Auyeung .............. 375/240.15 |

* cited by examiner

Primary Examiner — Yin-Chen Shaw
Assistant Examiner — Roderick Tolentino
(74) Attorney, Agent, or Firm — Christie, Parker & Hale, LLP.

(57) ABSTRACT

A method and system for low-latency processing of intra-frame video pixel block prediction including: predicting a pixel block based on boundary pixels of left and upper neighbor blocks of said pixel block; subtracting said predicted pixel block from a source pixel block to generate a prediction error; forward transforming and quantizing said prediction error to generate a residual data; inverse transforming and quantizing said residual data; adding said predicted pixel block to said inverse transformed and quantized residual data to generate a reconstructed pixel block; pre-computing blocks of DC-coefficients used with luma and chroma intra prediction modes; pre-computing mode selection of a best prediction mode of said luma and chroma intra prediction modes; and outputting said residual data to be used in entropy or arithmetic coding, and a reconstructed data used for motion prediction.

20 Claims, 4 Drawing Sheets

FIG. 1
PRIOR ART

FIG.2
PRIOR ART